Figure 1:
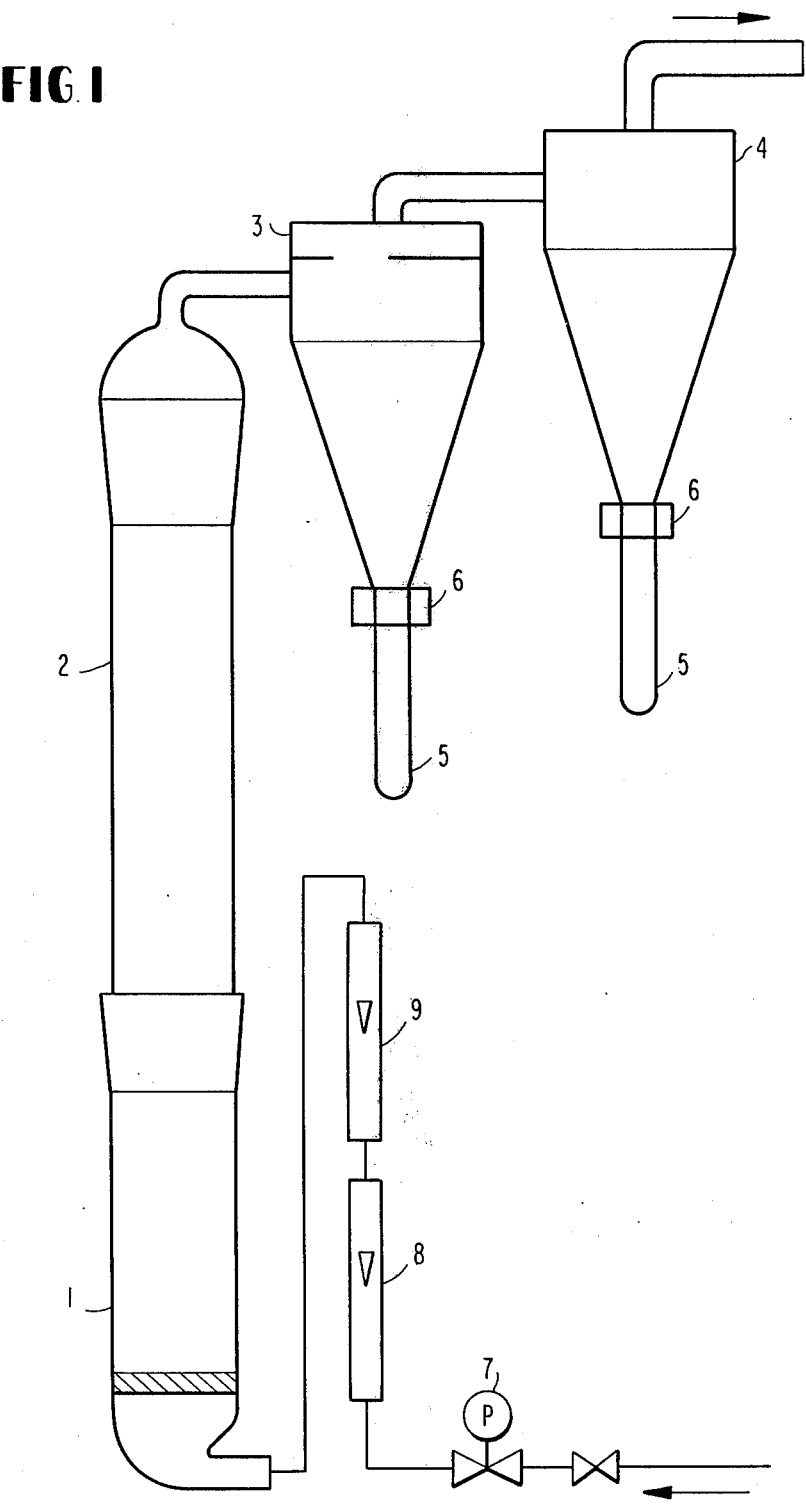

United States Patent [19]

Kilian et al.

[11] 4,179,431

[45] Dec. 18, 1979

[54] PRECIPITATED SILICIC ACID GRANULES

[75] Inventors: Eberhard Kilian, Hanau; Alfons Kreher, Frankfurt; Peter Nauroth, Wesseling; Günter Türk, Hanau, all of Fed. Rep. of Germany

[73] Assignee: Deutsche Gold-und Silber-Scheideanstalt vormals Rosseler, Frankfurt am Main, Fed. Rep. of Germany

[21] Appl. No.: 3,845

[22] Filed: Jan. 16, 1979

[30] Foreign Application Priority Data

Jan. 30, 1978 [DE] Fed. Rep. of Germany ....... 2803917

[51] Int. Cl.² ............................................... C08K 9/08
[52] U.S. Cl. ............................ 260/42.37; 106/308 M; 106/308 Q; 260/42.14; 423/339
[58] Field of Search ..................... 423/339; 260/42.37, 260/42.14; 106/308 Q, 308 M

[56] References Cited

U.S. PATENT DOCUMENTS

| 2,564,992 | 8/1951 | Pechukas | 260/42.14 |
| 3,271,356 | 9/1966 | Roderburg et al. | 260/42.14 |
| 3,607,337 | 9/1971 | Eisenmenger et al. | 260/42.14 |
| 4,017,452 | 4/1977 | Schwarz | 106/308 M |

Primary Examiner—Sandra M. Person
Attorney, Agent, or Firm—Beveridge, DeGrandi, Kline & Lunsford

[57] ABSTRACT

Free flowing, finely divided precipitated silicic acid granules of reduced dust content and reduced abrasion are obtained by a process including the step of subjecting a silicic acid suspension to intensive shearing action. Rubber compositions containing the precipitated silica produced in this way are also disclosed.

20 Claims, 1 Drawing Figure

PRECIPITATED SILICIC ACID GRANULES

The invention relates to precipitated silicic acid granules; the process for the production of the precipitated silicic acid granules from an aqueous precipitated silicic acid dough; and the use of the precipitated silicic acid granules.

The precipitated silicic acid granules are used by producers of rubber goods in order to introduce precipitated silicic acid as precisely as possible in a simple manner and with the least dust and with the use of the smallest possible transportation space as a filler for rubber mixtures that are to be vulcanized.

Precipitated silicic acid may be obtained by adding sulfuric acid to a sodium silicate solution while maintaining a certain pH value, whereby discrete silicic acid particles flocculate out without passing through a gelling state. (See German AS No. 10 49 843).

It is known to produce precipitated silicic acid granules by the dry method, by first precondensing powdery precipitated silicic acid with the use of negative pressure and mechanical pressure on revolving rollers and by molding the precipitated silicic acid granules by way of a profile attached on at least one of the rollers. (See German Pat. No. 18 07 714)

The precipitated silicic acid granules produced in this manner by the dry method and without addition are distinguished to be sure by a good dispersibility and freedom from grit, but on the basis of their method of production, they have a relatively high fines content and they are inclined thus to make dust. Also their transportation and siliconizing stability is not high, so that, even after screening of the dust portion immediately after the compression and breaking process, a high fines content is formed by abrasion which is a cause for dust problems during handling of the granules by the consumer. Beside these disadvantages of the precipitated silicic acid granules, the production method of the dry granulation according to German Pat. No. 18 07 714 has the disadvantage that in case of the granulation one must start out with finely ground precipitated silicic acid powders and the high, fines portion obtained during breaking or screening of the precipitated silicic acid must again be fed in circulation to the mill and thus the yield and capacity of the installation are reduced.

These disadvantages—as an evaluation of the physical, limiting conditions in the case of the dry compression process shows—may only be slightly influenced by the modification of the dry granulating technology. A higher degree of hardness of the granules adversely effects their dispersibility and increases the already high susceptibility to damage of the sintered metal roller because of the use of higher pressures. Moreover, the sharp-edged, irregular character of the granules may be changed only by a total change of the shaping roller. The irregular shape of the granules is one reason for their high abrasion.

Furthermore from German OS No. 21 50 345, it is known to produce precipitated silicic acid granules by wet granulation of precipitated silicic acid powder with diluted sulfuric acid as an auxiliary granulating agent. The precipitated silicic acid granules obtained however show a very low pH value, besides poor dispersibility, as a result of which this process contains corrosion problems with respect to the apparatus used in the process which problems are very difficult to solve.

German OS No. 20 30 172 describes the production of silicic acid rubber formulations with little dust and with good dispersing characteristics and reduced water content. The goal of this process however is the production of silicic acid-rubber batches, whereby the granular character of these substances is not in the foreground. The application of this production process does however encounter considerable difficulties based on environmental protection because of the high content of organic residual substances in the effluent of the process.

Furthermore, a process for the production of silicic acid-oil-granules by way of the wet pelletizing with the aid of extender oils, is known from German OS No. 23 55 570. In that case, one takes a course via the oil emulsion phase. The high content of oil of the precipitated silicic acid granules obtained, brings about a relatively good dispersibility. However, the predetermined high content of extender oil is not required frequently at all for the applications of the granules, and thus strongly restricts the use of the precipitated silicic acid granules produced in this manner.

It is an object of the invention to provide precipitated silicic acid granules having the following physical-chemical characteristics:

tamping weight (DIN 53 194): 200–320 g/l
l/d ratio (length/diameter): $0.8 \leq l/d \leq 3.5$
hardness of the individual granule: 80–175 pond
dust content (DIN 53 583): 0.2–0.4% by weight
abrasion (DIN 53 583): 0.2–0.3% by weight A further object of the invention is a process for the production of precipitated silicic acid granules with the following physical-chemical characteristics:

tamping weight (DIN 53 194): 200–320 g/l
l/d ratio: $0.8 \leq l/d \leq 3.5$
hardness of the individual granule: 80–175 pond
dust content (DIN 53 583): 0.2–0.4% by weight
abrasion (DIN 53 583): 0.2–0.3% by weight from an aqueous precipitated silicic acid filter dough wherein a precipitated silicic acid suspension is sheared intensively during and/or after its formation, the precipitated silicic acid is filtered off, washed, optionally a powdery precipitated silicic acid is admixed with the precipitated silicic acid filter cake obtained in the filtration, subsequently the precipitated silicic acid mass thus obtained is molded at a solids content of 28% by weight to 40% by weight, preferably of 30 to 34% by weight using a granulator for the production of precipitated silicic acid granules and these granules are subjected to drying for a short term.

FIG. 1 shows an apparatus for the measurement of the dust content.

The shearing of the precipitated silicic acid suspension may take place during the entire time period of its formation. This measure permits an intended control of the hardness of the granules, of the dispersibility, of the bulk weight, and of the abrasion of the granules. However, the shearing may also take place after the formation of the precipitated silicic acid at an alkaline pH, and preferably at a pH value of 7–12, or at an acid pH, preferably at a pH value of 2–7. Furthermore, the shearing may be accomplished after the addition of 1–5% by weight of stabilized latex emulsion mixed with anti-aging agents; e.g., a 22% emulsion of natural rubber in water. The shearing produces a grit-free product. Grit is defined as a very hard, difficulty dispersible particle under normal circumstances, with the size of a grain.

Reference is made to the definition of grit in MOCKER DIN 53,800 and DIN 53,195.

As an additive, 1-5% by weight of water miscible polyfunctional alcohols, e.g., ethylene glycol, may be used which are added directly to the precipitated suspension. The precipitated silicic acid suspension to be subjected to the shearing may have a solid substance content of 30-100 g/l. The duration of shearing may amount preferably to between 10 and 120 minutes, whereby 130 minutes should not be exceeded. For the shearing, dissolvers, turbine stirrers, Ultraturrax, reactors as well as centrifugal pumps may be used as the shearing apparatus. The shearing of the silicic acid suspension is accomplished for the purpose of the decomposition of the grit particles which could otherwise negatively influence the quality (dispersibility) of the finished silicic acid granules.

The filtration of the sheared precipitated silicic acid suspension may be accomplished with the help of filter presses of variable construction (chamber presses, frame presses, compression filter automatic machines) as well as with rotary filters (vacuum and pressure rotary filters). The content of solid substance of the silicic acid filter cake obtained may be between 15 and 28% by weight.

For the production of a free-flowing, moldable precipitated silicic acid mass, one may first place a powdery, finely divided precipitated silicic acid into a mixing apparatus; e.g., a plough share mixer. To this mixture, one may then add, by increments, a precrushed silicic acid filter cake whereby the solids content of the silicic acid mass thus formed may assume values between 28 and 40% by weight. Preferably, the solids content ranges from 30 to 34% by weight.

The finely divided precipitated silicic acid powder which may be admixed with the precipitated silicic acid powder may be obtained, for example, by drying and grinding of the basic filter cake. At the same time, one may use as a precipitated silicic acid powder totally sheared, partially sheared and not sheared precipitated silicic acid of the same basic precipitated type.

During the mixing of the precipitated silicic acid powder with the filter cake dough for the succeeding wet granulation there may be added: 1-5% (related to the dry substance) of additives such as, for example, water miscible polyfunctional alcohols, e.g., ethylene glycol, or 1-5% by weight of stabilized latex emulsion mixed with anti-aging agents e.g., a 22% emulsion of natural rubber in water. In principle, any suitable natural or synthetic latex may be used which are available as a latex emulsion. Basically in the case of the process of the addition of the precipitated silicic acid powder to the precipitated silicic acid filter cake dough one must pay attention that the processing of the precipitated silicic acid filter cake dough into a moldable precipitated silicic acid mass—be that in a continuous or discontinuous manner—is carried out in such a way that during the mixing process, no shaping takes place, and that the precipitated silicic acid mass remains free-flowing and does not convert over into a thixotropic pasty state.

The shaping of the precipitated silicic acid mass obtained with this method of mixing may take place with a solids content of 28 to 40% by weight—preferably 30-34% by weight—with the aid of so-called wet granulators, for example, with toothed roller granulators, smooth roller granulators, inside roller granulators and oscillating granulator machines. Preferably during the production of precipitated silicic acid granules, toothed roller granulators with the following characteristic data may be used.

Two-toothed roller shaping machine with a capacity of 4 KW.
Variable speed gearing 1:4, mean driving rpm used $n_2 = 40$ min.$^{-1}$
25 teeth, module 8 pitch circle diameter: 200 mm
operating width: 40 mm
nozzle diameter: 1.5 mm
nozzle length: 4 mm
throughput: approx. 150 kg/h silicic acid mass with 33% dry substance.

The precipitated silicic acid granules obtained may be in the form of cylindrical granules which have dimensions of 1 mm diameter $\times$ 1 mm height up to 1.5 mm diameter $\times$ 5 mm height.

In the granulation of the precipitated silicic acid mass one must be careful that the shearing tension used is sufficient for the following conditions:

$$1 \times 10^{-3} \text{ kg/cm}^2\text{s} \leq \tau \leq 3 \times 10^{-3} \text{ kg/cm}^2\text{s}$$

and that furthermore the nozzle diameter used as well as the nozzle length lie within $$1.0 \text{ mm} \leq d \leq 2 \text{ mm or}$$

$$1.0 \text{ mm} \leq l \leq 4 \text{ mm}.$$

The granulation of the moist mass of precipitated silicic acid requires a definite, limited shearing tension/time unit:$\tau$ which is related as a flow of mass to the cross section of the nozzle. In the case of shearing tension of $\tau \geq 3 \times 10^{-3}$ kg/cm$^2$s, for example at $\tau = 6$ kg/cm$^2$s, the compressed, moist material flows and one will obtain pasty, pressed goods not suitable for further processing. In the case of $\tau \leq 1.0 \times 10^{-3}$ kg/cm$^2$s, for example in the case of $\tau = 0.5 \times 10^{-3}$ kg/cm$^2$s, the molded blanks are of such a loose structure that they fall apart during the drying process at about 50% while forming a large dust portion. In these formulae, the symbol "s" denotes time in seconds.

For the short drying time, the following apparatuses may be used: fluidized bed-dryer, helical pipe dryer acted upon with hot gas, and current dryer. In view of the spontaneous, thorough drying of the wet granules the short drying time is an advantage, because shrinking and thus hardening processes do not take place as distinctly as in the case of conventional drying methods. As a result of the selection of the above mentioned types of driers, the probability of the grit formation which may occur as a result of contacts of the moist material with the wall during the drying, will be reduced drastically. On the basis of the definite granular shape, a uniform, short drying time is favored.

The cylindrically shaped granules may be dried preferably in an oscillating fluidized bed (Schwingfliessbett)-drier with a 0.3 mm diameter for the perforation in the discharge bottom. At the same time, a discharge speed of a few m/sec and a height of the fluidized bed of 150 to 300 mm may be maintained. The drying temperature may be selected between 200°-500° C. which corresponds to a drying time of 5-25 minutes. The dust of silicic acid obtained in the case of fluidized bed drying amounts to about 5-10% related to the dry granule). It may be fed to the precipitated silicic acid filter cake without grinding.

The process according to the invention has the following technological advantages:

The portion of dust of the precipitated silicic acid granules developing in the case of the fluidized bed drying is carried out through the dry air and thus without any additional operation, such as for example sieving. Precipitated silicic acid granules result, which have a very low portion of dust (1-2%).

the return of this dust (about 10%) into the filter cake preparation is possible without grinding, definite forms of precipitated silicic acid granules may be produced in a simple manner from which a high bulk weight, good stability (low abrasion), low portion of dust and definite, short drying times of the precipitated silicic acid granules result. On the basis of the definite drying time, only a slight shrinking and thus only a slight hardening of the particles result. The low hardening of the particles, in turn, is a premise for the good dispersibility of the precipitated silicic acid granules according to the invention.

On the basis of its characteristics, the form-stable precipitated silicic acid granules with little dust have all prerequisits of easy handling, of good stability in transportation and enable a precise dosing with continuously running mixing processes. Thus, they may be used advantageously and successfully in the rubber processing industry striving for more efficient operation.

The use of the precipitated silicic acid granules as a reinforcing filler in elastomers, thermoplastics and duromers, rests among other things on their excellent dispersibility which is a consequence of the conditions of the shearing and the short time drying selected in the production process. A duromer is a three-dimensional cross-linked polymer which after working up is hard and brittle. Thereafter, further thermoplastic working is not possible. Phenol/Resoreinol resins such as Bakelite is an example of this material.

The technical progress of the precipitated silicic acid granules according to the invention rests on two important and hitherto unachieved characteristics; namely, low dust content and low inclination to abrasion. In order to demonstrate the clear superiority of these two characteristics in comparison to the silicic acid soft granules according to the prior art, the following table is to be noted:

| Characteristics | Precipitated silicic acid granules of the invention | Precipitated silicic acid granules German patent 18 07 714 |
| --- | --- | --- |
| dust content (DIN 53 583) | 0.2% | 21.6% |
| abrasion (DIN 53 583) | 0.2% | 4.4% |
| dust content* | 0.5-2.0% | 13.5% |
| abrasion* | 0.15% | — |

*method of determination see below

As a comparison of the dust contents of the precipitated silicic acid granules according to the invention and of the silicic acid granules according to German patent No. 18 07 714 shows, the products according to the invention are by 1 to 1½ orders of magnitude lower than in the case of the prior art products. Also with reference to the abrasion, the precipitated silicic acid granules according to the invention show remarkable advantages: thus, the DIN-abrasion of the silicic acid granules of the invention is lower by one order of magnitude than the DIN-abrasion of the traditional precipitated silicic acid granules.

The determination of the dust content and of the abrasion behavior according to DIN 53 583 is known. Independently of that, a new method of determination of the dust content and the abrasion behavior of precipitated silicic acid granules was developed.

The principle of measuring resides in the fact that a stream of air is guided at a definite speed through this silicic acid granules, and the fines portions of the silicic acid granules are separated in a small measuring cyclone. The degree of effectiveness of the small cyclones is 99%. FIG. 1 shows the apparatus for the measuring of the dust content. In the case of silicic acid granules, 10 g are weighed and an air velocity of 0.1 m/sec. is adjusted.

The following method of operation is followed: the device is illustrated in FIG. 1 and consists of the glass frit 1 (G 3) with a tube, a glass tube 2, in which the air velocity amounts to 0.1-0.5 m/sec, the measuring cyclones 3 and 4 are made of glass and are equipped with collecting pipes 5 as well as with the screw closure 6, the pressure reduction valve 7, the flow meter 8 (measuring range 1) and the flow meter 9 (measuring range 2), and is attached to a compressed air system (maximally 10 bar). The adjustment of the volume of air is accomplished by a pressure reducing valve which at the beginning of the measurement had been set to "without pressure". The adjustment of the air velocity is accomplished by two flow meters each with a measuring range of 0-0.1 m/sec and 0.1-0.5 m/sec. The silicic acid is filled into the lower ground connection. After a measuring time of five minutes, the remaining silicic acid separated in the cyclone is weighted and the percentage portion is calculated.

For determining the stability in transportation, 100 g of granulated silicic acid are rotated in a DIN metal tin with pressed in cover and the dimensions of d=100 mm, h=110 mm, for 24 hours on a rolling mixer rotating at 150 rph. Subsequently, the portion of dust is determined. Previously the portion of dust had been determined in the original by means of the method described.

The comparative measurements presented herein show the clear superiority of the precipitated silicic acid granules of the invention as compared to the precipitated silicic acid granules of the prior art. The lack of dust in the precipitated silicic acid granules of the invention makes it possible for the user to maintain the low MAK-value (maximal concentration in the work place) for inert dusts (8 mg/Nm$^3$)—amorphous silicic acid is counted among them—prescribed by the legislators. Since in many countries of the world the trend of legislation makes one expect in the future a further reduction of the MAK-value (in England the MAK-value of 3 mg/Nm$^3$ was just introduced), the technical progress achieved by the invention is beyond dispute.

The process of the invention will be explained and described in more detail on the basis of the following examples.

EXAMPLE 1

For the production of a precipitated silicic acid suspension, a precipitation apparatus is used which, in supplementation of the known standard apparatuses, is equipped with a dispersing device and in addition with a 700 l dissolver with a disc diameter of 300 mm and a peripheral speed of 21 m sec$^{-1}$.

For the precipitation, first of all 470 liters of hot water and 73.4 liters of sodium silicate (density: 1.17 g/cm$^3$, ratio SiO$_2$:Na$_2$O=3.30)are heated to 83° C. while stirring. Into this alkaline precipitation batch, 77 l/h sodium silicate (density: 1.35 g/cm$^3$, ratio=3.30 and 13.3 l/h 55% sulfuric acid (density: 1.45 g/cm$^3$) are introduced simultaneously during the following 90 minutes while stirring and with continuous dispersion. After that, this silicic acid suspension is adjusted to a pH value of 3.5 with 55.5% sulfuric acid (density: 1.45 g/cm$^3$) which is accomplished by an influx of acid at a rate of 17.5 l/h lasting for 35 minutes. Even during this phase of the acid adjustment of the suspension, it is continuously dispersed with the help of a dissolver. The silicic acid suspension sheared in this manner, is filtered on a filter press and washed. The filter cake thus obtained has a solids content of 21%. Its volume is 240 kg.

100 kg of this filter cake are subsequently dried in a pilot plant drying cabinet and are ground with a disc mill. 21 kg of a finely dispersed white powder is obtained, whereby this powder is put into a slowly running Loedige mixer and is mixed with 100 kg of the above residual filter cake, after which the solids content of the silicic acid mass thus forming is 33%.

Subsequently, the silicic acid material (33% SiO$_2$) produced in this manner is molded on a toothed roller granulator into cylindrical granules of the size of about 1.2 mm diameter and about 2 mm length. The toothed roller granulator used has the following characteristic data:
2-toothed roller molding machine, capacity 4 KW
variable speed gear: 1:4
mean driving rpm used: n$_2$=40 min.
number of teeth: 25
ratio: 8
pitch circle diameter: 200 mm
operating width: 40 mm
nozzle diameter: 1.2 mm$\leq$d$\leq$2.0 mm
number of nozzles per gap of tooth: 52
length of nozzle: 2-4 mm
mean throughput quantity of moist precipitated silicic acid mass with 33% dry substance: 150 kg/h
preferred shearing stress: $\tau = 2 \cdot 10^{-3}$ kg/cm$^2 \cdot$s
shearing stress used: $1 \times 10^{-3}$ kg/cm$^2 \cdot$s$\leq \tau \leq 3 \times 10^{-3}$ kg/cm$^2 \cdot$s The moist cylindrical granules are subsequently dried in an oscillating fluidized bed drier having 0.6 m$^2$ free surface and with perforations of 0.3 mm diameter in the flow bottom. At the same time, a flow velocity of 1.2 m/sec. and a flow bed level of 150-200 mm is maintained. The temperature of the drying air is 118°-119° C., the drying time is 6 minutes. The air volume for drying is 2600 m$^3$/h. The dry silicic acid granules obtained have the following physico-chemical characteristics:
tamping weight (DIN 53 194): 230 g/l
dimensions of the granule: d=1.2 mm; l=2 mm
l/d ratio=1.7

The silicic acid suspension prepared according to example 1 will be filtered and washed, for example utilizing a pistion-membrane pump, through a suitable filter press such as a chamber-filter press or a membrane-filter press or an automatic filter press operating at a pressure of from 10 to 30 bar, preferably 15 to 20 bar. The filtercake thus obtained has a solids content of 28%. This solids content lends the filtercake a consistency for granulization without returning to powder.

The filter cake thereby obtained will be compressed in a granulating machine as described, or in an intergranulating machine with 2 mm of opening section. With the intergranulating machine, the filtercake will be brought into a borer and by way of a roller or a plunger compressed through the opening in an outward direction.

| granule dimensions | diameter = 2 mm |
| --- | --- |
| | length = 3.5 mm |
| | l/d ratio = 1.7 |
| | tamping weight (DIN 53 194) = 240 g/l. |

EXAMPLE 2

A silicic acid suspension is produced according to example 1. At the same time one disperses continuously, however, not during the first 90 minutes, i.e., during the alkaline precipitation phase, but only with the beginning of the so-called "acid adjustment phase" for a time of 35 minutes with the help of the dissolver.

After the filtration and washing, one obtains 230 kg of a filter cake with 20% solids content.

In a slowly running Loedige mixer, 15 kg of a finely dispersed silicic acid powder, produced according to example 1, are introduced and are mixed with 66 kg of the filter cake prepared according to above example No. 2, whereby the solids content of the precipitated silicic acid mass forming thereby is adjusted to a value of 33%.

Subsequently, the free flowing precipitated silicic acid mass produced in this manner is molded with 33% SiO$_2$ on the toothed roller granulator according to example 1 into cylindrically shaped granules of about 1.2 mm diameter and 2.0 mm length in size whereby the limiting conditions mentioned in example 1 are maintained.

The moist, cylindrical granules are dried in the oscillating fluidized bed drier according to example 1 under the following conditions:
discharge velocity of the drying air: 1.7 m/sec
drying time: 4 minutes
drying air temperature: 200° C.
drying air volume: 3570 m$^3$/h The physico-chemical data of the precipitated silicic acid granules found are:

| tamping weight (DIN 53 194) | 280 g/l |
| --- | --- |
| dimensions of granules: | d = 1.2 mm |
| | l = 2 mm |
| l/d ratio | = 1.7 |

EXAMPLE 3

The production of the precipitated silicic acid is accomplished according to example 1. The precipitated silicic acid suspension is dispersed only after the acid adjustment at a pH value of 3.5 for 30 minutes with the dissolver. After the filtration has been accomplished and after washing out of the filter cake, the latter has a solids content of 17%. Approximately 295 kg of filter cake are obtained.

100 kg of this filter cake are then dried in a shelf drying cabinet and are ground up in a disc mill. A volume of 17 kg of a finely divided silicic acid powder is obtained.

17 kg of this precipitated silicic acid powder together with 66 kg of precipitated silicic acid filter cake are converted with the help of the described mixing technique into the silicic acid mass to be granulated with a solids content of 32% and subsequently are molded with the 2-toothed roller machine according to example 1 into cylindrical granules of the dimensions of 1.5 mm diameter and 4 mm length. At the same time, the limiting conditions of the wet granulation mentioned in example 1 must be maintained under all circumstances. There follows the drying by charges of the wet granules into the oscillating fluidized bed drier according to example 1 under the following conditions:
drying time: 24 minutes
drying air temperature: 310° C.
dust volume in the filter: 7% ( $\triangleq$ 1.9 kg)
granule volume (wet): 83 kg
granule volume (dry): 24.7 kg The characteristic data of the dry precipitated silicic acid granules are:

| | |
|---|---|
| tamping weight (DIN 53 194) | 282 g/l |
| dimensions of granules: | d $\leq$ 1.5 mm |
| | l = 2–3 mm |
| individual grain hardness of the granules | 157 pond |
| l/d ratio | 1.3–2.0 |

EXAMPLE 4

The production of precipitated silicic acid is accomplished according to example 1. After the 90th minute of the precipitation, i.e., after completion of the alkaline precipitation phase, the inflow of the sulfuric acid is stopped for the time being and the alkaline precipitated silicic acid suspension is sheared with the dissolver for 30 minutes. After that, the suspension is acidified according to the description in example 1 up to a pH value of 3.5, is filtered and is washed on the filter press. 280 kg of precipitation silicic acid filter cake with a solids content of 18% is obtained.

120 kg of this precipitated silicic acid filter cake are subsequently dried in a drying cabinet and are ground in a disc mill. In this case, approximately 22.0 kg of a finely divided precipitated silicic acid powder are obtained which, in continuation of the process, together with 91 kg of the above precipitated silicic acid filter cake is then converted into the moist, powdery precipitated silicic acid mass to be granulated with a solids content of 32% and is subsequently molded in the toothed roller granulator according to example 1 into cylindrically shaped wet granules with a diameter of 1.5 mm and 4 mm length. This is accomplished while maintaining the limiting conditions according to example 1 set for the wet granulation.

The fluidized bed drying by charges of the 113 kg of precipitated silicic acid granules takes place under the following conditions:
drying time: 19 minutes
drying air temperature: 310° C.

34.9 kg of a dry granulate with little dust is obtained. Approximately 3.6% of the dry granulate volume produced altogether, that is 1.3 kg, are again found in the dust filter.

The precipitated silicic acid granule obtained has the following characteristic data:

| | |
|---|---|
| tamping weight (DIN 53 194) | 278 g/l |

-continued

| | |
|---|---|
| dimensions of the granules | d $\leq$ 1.5 mm |
| | l = 2–3 mm |
| individual grain hardness of the granules | 111 pond |
| dust content* | 2% |
| l/d ratio | 1.3–2.0 |

*determined according to the method described in this application.

EXAMPLE 5

A precipitated silicic acid suspension according to example 4 is produced. During the 30 minutes shearing interval, the following quantities of additives are added to the precipitated silicic acid suspension:

0.5 kg of a 22% latex emulsion, that is 1% latex emulsion related to the $SiO_2$ content of the silicic acid suspension 1.4 g of an anti-aging agent on the basis of an alkalized styrene phenol resin, Wingstay V, that is 1.25% related to the active substance of the latex emulsion.

2.2 g of a stabilizer on the basis of a polyglycol ether, Genapol ®, that is to say 2% related to the active substance of the latex emulsion.

After the shearing process, the precipitated silicic acid suspension is acidified to a pH value of 3.5 according to example 1. After filtration and washing out on the filter press, one will obtain 252 kg of a precipitated silicic acid filter cake with a solid substance content of 20%.

20 kg of a dry, finely divided precipitated silicic acid powder produced according to example 4 are processed with 88 kg of the above precipitated silicic acid filter cake containing additives in the Loedige mixer to a silicic acid mass with a solids content of 33% and are molded subsequently in the toothed roller granulator according to example 1 into cylindrically shaped, wet granules with a diameter of 1.5 mm and 4 mm length. The fluidized bed drying by increments of the 108 kg of silicic acid wet granules takes place under the following conditions:
drying time: 23 minutes
drying air temperature: 320° C.

33 kg of a dry granules with little dust are obtained. 7.2% of the totally produced dry granules volume, that is to say 2.6 kg, is found again in the dust filter of the fluidized bed drier.

The precipitated silicic acid granules obtained have the following characteristic data:
tamping weight DIN 53 194: 291 g/l
dimensions of the granulate: d $\leq$ 1.5 mm; l=2–3 mm
individual grain hardness of the granulate: 121 pond
l/d ratio: 1.3–2.0

EXAMPLE 6

The production of the silicic acid suspension is accomplished according to example 1 with, however, the following deviations:

A precipitation temperature of 90° C. is selected. After the 90th minute, the acid adjustment by acidification with sulfuric acid is started, however at that point, it is acidified only up to a pH value of 8.5 and a stabilization period of 30 minutes takes place at 90° C. After that, the acidification is continued up to a value of 3.5 with 55.5% sulfuric acid at an acid dosing of 17.5 l/h.

The dissolver dispersion is not accomplished during the precipitation phase, but only after the acid adjustment to a pH value of 3.5 for a duration of 30 minutes and this however without heat supply from the outside.

The precipitated silicic acid suspension sheared in this manner is filtered on a filter press and is washed. The precipitated silicic acid filter cake obtained has a solid substance content of 20%. A volume of 252 kg is obtained.

100 kg of this precipitated silicic acid filter cake are subsequently dried in a pilot plant drying cabinet and are ground in a disc mill. One will obtain 20 kg of a fine, powdery precipitated silicic acid. This is placed into a slowly running Loedige mixer and is mixed with 97 kg of the above precipitated silicic acid filter cake, after which the solids content of the precipitated silicic acid thus forming is 32%. This mass is then molded on a toothed roller granulator according to example 1 into cylindrical, wet granules with a diameter of 1.5 mm and 4 mm length, whereby the limiting conditions according to example 1 are maintained.

The fluidized bed drying of the 117 kg of precipitated silicic acid wet granules is accomplished under the following conditions:
drying time: 20 minutes
drying air temperature: 350° C.

34 kg of a dry granules are obtained. 9% of the drying granules volume produced altogether, that is 3.4 kg, are found in the dust filter of the fluidized bed drier.

The silicic acid granules have the following characteristic data:
tamping weight (DIN 53 194): 256 g/l
dimensions of the granule: d≦1.5 mm; l=2–3 mm
individual hardness of the granules: 88 pond
dust content*: 1%
abrasion*: 0.15%
l/d ratio: 1.3–2.0
*=measurement according to the method stated in the descriptive part.

EXAMPLE 7

30 kg of a precipitated silicic acid filter cake with a solids content of 20% produced according to example 6, are converted with 6.5 kg of the dry precipitated silicic acid powder, likewise obtained according to example 6, as well as with 0.1 kg of ethylene glycol (related to the dry substance of the filter cake, that is 1.6%) in the Loedige mixer into a precipitated silicic acid mass with a solids content of 33%. Subsequently, this precipitated silicic acid mass is molded with the toothed roller granulator according to example 1 into cylindrically shaped, wet granules with a diameter of 1.5 mm and of 4 mm length. The fluidized bed drying by increments of the 37 kg of wet granules is accomplished under the following conditions:
drying time: 14 minutes
drying air temperature: 300° C.

11 kg of dry granules with little dust are obtained. 10% of the dry granule volume produced altogether, that is to say 1.2 kg, are found in the dust filter of the fluidized bed drier.

The precipitation silicic acid granulate obtained has the following characteristic data:
tamping weight (DIN 53 194): 268 g/l
dimensions of the granulate: d≦1.5 mm; l=2–3 mm
individual hardness of the granules: 96 pond
abrasion: 0.18%
dust content*: 1.5%
l/d ratio: 1.3–2.0
*measurement according to the method stated herein.

EXAMPLE 8

The testing for industrial use of the silicic acid granules with little dust according to the examples 1–7 in rubber (Cariflex 1509) is accomplished in comparison to the precipitated silicic acid granules according to German Pat. No. 18 07 714. The test data are summarized in tables I, II and III:

Table I

| | Test recipe and sequence of the production of the mixture | | | | | | | | |
|---|---|---|---|---|---|---|---|---|---|
| | 1 | 2 | 3 | 4 | 5 | 6 | 7 | A | B |
| Cariflex 1509 | 100 | | | | | | | | |
| precipitated silicic acid granules acc. to example 1 | 50 | | | | | | | | |
| 2 | | 50 | | | | | | | |
| 3 | | | 50 | | | | | | |
| 4 | | | | 50 | | | | | |
| 5 | | | | | 50 | | | | |
| 6 | | | | | | 50 | | | |
| 7 | | | | | | | 50 | | |
| precipitated silicic acid granules A of German patent 18 07 714 | | | | | | | | 50 | |
| precipitated silicic acid granules B of German patent 18 07 714 | | | | | | | | | 50 |
| ZnO, active | 2 | | | | | | | | |
| stearic acid | 2 | | | | | | | | |
| diethylene glycol | 3 | | | | | | | | |
| triethanol amine | 0.5 | | | | | | | | |
| Vulkazit D | 1.2 | | | | | | | | |
| Vulkazit DM | 0.8 | | | | | | | | |
| sulfur | 2.5 | | | | | | | | |

Table II

| | unvulcanized mixture Mooney test acc. to DIN 53 523/524: | | | | | | | | |
|---|---|---|---|---|---|---|---|---|---|
| | 1 | 2 | 3 | 4 | 5 | 6 | 7 | A | B |
| ML 4(100° C.) | 83 | 76 | 112 | 116 | 111 | 66 | 68 | 84 | 64 |
| t5 (121° C.)(min) | 15.0 | 11.2 | 14.7 | 12.4 | 15.9 | 11.0 | 8.6 | 10.4 | 13.8 |
| t 35(121° C.)(min) | 18.6 | 13.9 | 18.5 | 18.7 | 20.3 | 13.7 | 10.6 | 12.5 | 11.1 |

Table III

| | Results of the rubber industrial test vulcanized mixture; vulcanizing temperature: 160° C. | | | | | | | | |
|---|---|---|---|---|---|---|---|---|---|
| Example | 1 | 2 | 3 | 4 | 5 | 6 | 7 | A | B |
| vulcanization time: (minutes) | 8 | 8 | 8 | 8 | 8 | 8 | 8 | 8 | 8 |
| | 12 | 12 | 12 | 12 | 12 | 12 | 12 | 12 | 12 |
| Tensil strength: (DIN 53 504) | 147 | 142 | 160 | 168 | 171 | 139 | 124 | 153 | 130 |
| | 135 | 148 | 150 | 149 | 156 | 134 | 121 | 146 | 123 |
| pressure value 300: | 48 | 34 | 44 | 43 | 44 | 45 | 40 | 38 | 35 |
| | 49 | 33 | 45 | 43 | 44 | 45 | 41 | 38 | 44 |
| pressure value 500: | 99 | 74 | — | — | — | — | — | 82 | — |
| | 102 | 73 | — | — | — | — | — | 83 | — |
| extension at break | 602 | 640 | 651 | 675 | 686 | 580 | 570 | 636 | 599 |
| | 572 | 640 | 634 | 642 | 653 | 547 | 553 | 622 | 577 |
| Shock elasticity (DIN 53 512) | 35 | 34 | 41 | 40 | 41 | 40 | 39 | 36 | 39 |
| | 34 | 33 | 40 | 41 | 42 | 40 | 41 | 37 | 39 |
| Shore-A-hardness (DIN 53 505) | 73 | 69 | 76 | 76 | 76 | 70 | 68 | 70 | 67 |
| | 73 | 68 | 77 | 76 | 75 | 70 | 69 | 71 | 68 |

The results of the rubber industrial test may be summarized as follows in comparison to the granules of the status of the prior art; at the same time the results of the mixtures Nos. 1–5 are comparable with those of the mixture A and the ones of the mixtures Nos. 6 and 7 with those of the mixture B.

Mooney Test

In the Mooney test, the values of the mixtures 1 and 2 are equal or somewhat higher and the values of the mixtures 4 and 6 are clearly above the reference mixture A. The vulcanization behavior of the mixtures 1–5, expressed by the t5 and t35 values, is slower than that of the reference mixture A.

The Mooney viscosity values of the mixtures No. 6 and 7 in comparison to their reference mixture B are slightly above it, while the vulcanization of the mixtures No. 6 and 7 takes place somewhat slower than that of the reference mixture B.

Static Data

In the case of the pressure 300 values of the mixtures 1, 3, 4 and 5, a more or less definite tendency appears for higher values in comparison to the reference mixture A. The pressure 300 value of the mixtures 6–7 lies clearly above the value level of their reference mixture B. The pressure 300 value of the mixture 2 comes very close to the reference mixture A.

The Shore-A-hardness of the mixtures Nos. 1,3,4 and 5 hardnesses lie above the level of the Shore-A-hardness of the reference mixture A, the Shore-A-hardness of the mixture No. 2 is on the level of the reference mixture 8. For the Shore-A-hardness of the mixtures 6 and 7, one can hardly find a difference to the reference mixture B.

Dispersion Test

It is the more difficult to distribute fillers in elastomers, the lower the viscosity of the elastomers is. Therefore, butyl rubber (ML=50) is the suitable material for such investigations. The dispersion test consists in the fact that butyl rubber mixtures are produced in dependence on the mixing time, a constant volume (100 g) of the butyl rubber mixture is strained through a suitable strainer and the residue of the strainer screen is investigated directly or indirectly for its filler content.

A description of the dispersion test as well as of its method of evaluation are stated below:

| Content of the Experiment | |
|---|---|
| Recipe | |
| Polisar butyl 301 | 100.0 parts by weight |
| iron oxide batch * | 16.45 parts by weight |
| plasticizer KP 140 | 5.6 parts by weight |
| Ultrasil VN 3 | 50.0 parts by weight |
| Quantities used for 2.5 l kneader: | |
| Polisar butyl 301 | 1634 |
| Iron oxide batch * | 269 |
| Plasticizer KP 140 | 91 |
| filler | 817 |
| Production of mixture | |
| mixing aggregate: | 2.5 l laboratory inside mixer Homrich LK 2.5 |
| rpm of blades: | 48 rpm |
| kneader flowthrough temperature | 80° C. |
| Directions of mixing | |
| 0' rubber and batch of iron oxide are masticated for 2' | |
| 2' ⅓ filler | |
| 3' ⅓ filler and plasticizer | |
| 4' last third filler | |
| 7' end of the mixing process of the first mixture (total mixing time of the filler: 5') | |
| 8' end of the mixing process of the second mixture (total mixing time of the filler: 6') | |
| 9' end of the mixing process of the third mixture (total mixing time of the filler: 7') | |

Always at the end of the kneader mixing time, the mixture is drawn out on the roller to a skin.

Straining of the Mixture 100 g of every mixture is strained.

| | |
|---|---|
| diameter of the strainer: | 18mm |
| effective diameter of the strainer: | 10mm |
| width of the mesh of the strainer: | 150 mesh |
| extruder | Brabend-Plastograph type PI 3 with preceding injection head (spray head) type 200 D |
| speed of revolutions of the screw | 60 rpm |
| extruder head temperature | 80° C. |

Molding of the Strainer Residue

For the determination of the residue of the strainer, one uses whatever remains after the cut at a 5 mm distance from the strainer as a rubber mixture. This mixing residue is separated from the strainer and is molded between two aluminum foils.

| | |
|---|---|
| molding | laboratory vulcanizing press |
| press pressure | 190 at ü |
| press temperature | 155° C. |
| pressing time | 5 sec. |
| aluminum foil | 0.1 mm thickness |
| foil surface | 150 mm × 150 mm |

Preparation of the Molded Material

The molded material is dipped into liquid nitrogen. In this way, the rubber may be separated from the aluminum foil without damaging the aluminum foil.

The engravings of the strainer residue on the aluminum foil are photographed in a darkened room and are enlarged by a factor of 2.

Evaluation

For the optical evaluation, the number of engravings and their width on the picture is used.

*Production of the batch of iron oxide

| Recipe | |
|---|---|
| Polisar Butyl 301 | 700.0 parts by weight |
| iron oxide | 700.0 parts by weight |
| mixing aggregate | lab roller |
| roller dimensions | diameter 200 mm |
| | operating width 350 mm |
| roller temperature | 70° C. |
| roller friction | 1 : 1.4 |

The results of the dispersion test according to the test in butyl rubber as described above show a very good dispersion behavior for the mixtures Nos. 3, 4 and 7; for the other mixtures Nos. 1, 2, 5 and 6, approximately the picture of the dispersibility of the reference granulates A and B result.

In summary, it may be said that from the standpoint of their industrial rubber behavior, the precipitated silicic acid granules of the invention hardly or only slightly deviates from the behavior of the precipitated silicic acid granules of German Pat. No. 18 07 714. Any possible, necessary changes may be made by corresponding design of the mixing recipe without any difficulties.

We claim:

1. Precipitated silicic acid granules having the following physical-chemical properties:
   tamped weight (DIN 53 194): 200–320 g/l
   l/d ratio: $0.8 \leq l/d \leq 3.5$
   hardness of individual granule: 80–175 pond
   dust content (DIN 53 583): 0.2–0.4% by weight
   abrasion (DIN 53 583): 0.2–0.3% by weight.

2. Process for the production of precipitated silicic acid granules having the following physical-chemical properties:
   tamped weight (DIN 53 194): 200–320 g/l
   l/d ratio: $0.8 \leq l/d \leq 3.5$
   hardness of individual granulate: 80–175 pond
   dust content (DIN 53 583): 0.2–0.4% by weight
   abrasion (DIN 53 583): 0.2–0.3% by weight
from a water containing filter dough of precipitated silicic acid, comprising subjecting a precipitated silicic acid suspension to intensive shearing, filtering the precipitated silicic acid, washing the precipitated silicic acid and optionally mixing the precipitated silicic acid filter cake that is obtained with powder formed precipitated silicic acid, to obtain a mass of precipitated silicic acid and compressing said mass at a solid substance content of 28% by weight to 40% by weight, with a granulator for the production of precipitated silicic acid granules and drying the said granules for a short time.

3. The process as set forth in claim 2, wherein the shearing of the precipitated silicic acid suspension is carried out during the entire period of time of its formation.

4. The process as set forth in claims 2 or 3 wherein the shearing of the precipitated silicic acid suspension is carried out after its formation at an alkaline pH.

5. The process as set forth in claims 2 and 3, wherein the shearing of the precipitated silicic acid suspension is carried out after its formation at an acid pH.

6. The process as set forth in claims 2 or 3, wherein the shearing of the precipitated silicic acid suspension is carried out after its formation and after the addition of 1–5% by weight of a stabilized latex emulsion mixed with anti-aging agents.

7. The process as set forth in claims 2 or 3, wherein the shearing of the precipitated silicic acid suspension is carried out after its formation and after the addition of 1–5% by weight of at least one water-miscible, polyfunctional alcohol.

8. The process as set forth in claims 2 or 3, wherein a precipitated silicic acid suspension is sheared which has a solid substance content of 30 to 100 g/l.

9. The process as set forth in claims 2 or 3, wherein the precipitated silicic acid suspension is sheared for up to 130 minutes.

10. The process as set forth in claims 2 or 3 wherein the precipitated silicic acid filter cake has a solid substance content of 15–28% by weight.

11. The process as set forth in claims 2 or 3, wherein a precipitated silicic acid is used as the powder formed precipited silicic acid, which had been obtained from the filter cake by drying and pulverizing.

12. The process as set forth in claim 11, wherein a precipitated silicic acid is used as a powder formed precipitated silicic acid, which was obtained from a precipitated silicic acid suspension which had not been sheared prior to filtering.

13. The process as set forth in claim 11, wherein a precipitated silicic acid is used as a powder-shaped precipitation silicic acid which was obtained from a precipitation silicic acid suspension which was sheared prior to filtering.

14. A process as set forth in claim 11, wherein the addition of the powder formed precipitated silicic acid to the precipitated silicic acid cake is carried out continuously or discontinuously in a mixer in such a way that no formation of shape of the precipitated silicic acid mass takes place, and the precipitated silicic acid mass remains free flowing and at the same time does not convert into the thixotropic pasty state.

15. A process as set forth in claims 2 or 3, wherein 1-5% by weight of polyfunctional, water-miscible alcohols, or 1-5% by weight of stabilized latex emulsion mixed with antiagers, is added during the addition of the powder formed precipitated silicic acid.

16. A process as set forth in claims 2 and 3 wherein a toothed roller granulator is used as a granulator.

17. A process as set forth in claims 2 and 3 wherein the precipitated silicic acid granules are produced in the shape of cylinder granules having a dimension of 1 mm diameter×1 mm height to 1.5 mm diameter×5 mm height.

18. A process as set forth in claims 2 and 3 wherein the production of precipitated silicic acid granules is carried out in a granulator, while maintaining a definite ratio of shearing stress/time unit $\tau$, within a range of $1 \times 10^{-3}$ kg/cm$^2$·s $\leq \tau \leq 3 \times 10^{-3}$ kg/cm$^2$·s.

19. A process as set forth in claims 2 and 3 wherein the duration of drying of the precipitated silicic acid granules is 5 to 25 minutes in a fluidized bed.

20. A rubber composition containing as a filler the precipitated silicic acid granules as set forth in claim 1.

* * * * *